(12) United States Patent
Schultheis

(10) Patent No.: US 6,406,552 B1
(45) Date of Patent: Jun. 18, 2002

(54) METHOD FOR CLEANING $SiO_2$ GRAIN

(75) Inventor: Andreas Schultheis, Langenselbold (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 09/453,762

(22) Filed: Dec. 2, 1999

(30) Foreign Application Priority Data

Dec. 3, 1998 (DE) ......................................... 198 55 816

(51) Int. Cl.$^7$ ................................................ B08B 7/00
(52) U.S. Cl. ........................... 134/5; 134/19; 134/25.1; 134/25.4
(58) Field of Search ............................. 134/5, 19, 25.1, 134/25.4

(56) References Cited

FOREIGN PATENT DOCUMENTS

| DE | 33 21 589 | * | 6/1984 |
| DE | 242 570 | | 2/1987 |
| DE | 198 13 971 | | 10/1999 |
| EP | 0 737 653 | * | 10/1996 |

OTHER PUBLICATIONS

Patent Abstracts of Japan for JP 57111224.
Abstract XP–00213177 for SU 177 0024.
Abstract for DE 3321589.
Abstract for DE 198 13 971.

* cited by examiner

*Primary Examiner*—Zeinab El-Arini
(74) *Attorney, Agent, or Firm*—Andrew L. Tiajoloff

(57) ABSTRACT

A method for the cleaning of $SiO_2$ grain is known whereby $SiO_2$ grain comprising contaminations is heated to a temperature at which the contaminations soften or form melting agglomerates with the $SiO_2$ grain, thus separating the contaminations and the $SiO_2$ grain. On this basis and to specify a method which achieves high grain purity at comparatively little expenditure of time, material and costs, and to provide a simple device suitable for the implementation of the method, it is proposed according to the invention that the $SiO_2$ grain is fed to and heated in a gas stream which is directed towards an impingement plate, the $SiO_2$ grain being accelerated in the direction of the impingement plate such that softened contaminations or melting agglomerates adhere to the impingement plate and cleaned $SiO_2$ grain is removed from the impingement plate. A simple device suitable for the implementation of the method is provided with a burner into which a burner gas is introduced for a, burner gas flame, and a feeder device by means of which the $SiO_2$ grain containing contaminations is fed to the burner gas or the burner gas flame, as well as an impingement plate toward which the burner gas flame is directed.

11 Claims, 2 Drawing Sheets

METHOD FOR CLEANING SIO₂ GRAIN

FIELD OF THE INVENTION

This invention concerns a method for cleaning the $SiO_2$ grain, by means of heating the $SiO_2$ grain comprising contaminations to a temperature at which the contaminations soften or form melting agglomerates with the $SiO_2$ grain, and the separation of contaminations and $SiO_2$ grain. Furthermore, the invention concerns a device for the implementation of the method.

DISCUSSION OF PRIOR ART

DE-C1 33 21 589 describes a generic method for the cleaning of quartz sand and a device for the implementation of the method. For the separation of mineral contaminations in quartz sand, present for example as intergrowth of feldspar or garnet with quartz grains, it is proposed to heat a screen fraction of the quartz sand, sized 180 μm to 250 μm, to a temperature of 1,370° C. in an electrically heated rotary furnace with an SiC rotary tube. Due to this heat treatment performed over a period of 30 minutes, the contaminations soften so as to form melting agglomerates with each other or with quartz grains. In contrast, the quartz grains themselves do not soften so that they will essentially retain their original size and morphology. After cooling down, the melting agglomerates are screened out or separated from the purified quartz sand by means of air sifting.

This method enables a batch-wise cleaning of quartz sand from contaminations, under the prerequisites that the contaminations will bind in melting agglomerates and that the melting agglomerates are larger than the employed screen fraction of the quartz grain. It has been shown, however, that these prerequisites are not always met and that, moreover, the melting agglomerates are mechanically unstable and easily disintegrate again during the separation process and thus cannot be easily removed from quartz sand by means of screening or air sifting.

For many applications of $SiO_2$ powder—for example as the starting material for quartz glass components to be used in semiconductor manufacture or for optics, the starting materials' purity is subject to extremely high requirements which can be met by the known method only with great expenditures of time, materials and costs. To avoid any contaminations due to abrasion during the cleaning process, high-purity, partly high-temperature resistant, expensive device components are required—such as rotary tubes made of SiC, for example.

Some of these disadvantages are avoided by a cleaning method suitable for the continuous cleaning of quartz powder, as described in EP-A1 737 653. The quartz powder to be cleaned, with a mean grain size between 106 μm and 250 μm, is continuously fed to an electrically heated rotary furnace of quartz glass in which it runs successively through a preheating chamber, a reaction chamber and a gas desorption chamber. In the preheating chamber, the quartz powder is heated to approx. 800° C., and subsequently treated in the reaction chamber at a temperature of about 1,300° C. with a gas mixture of chlorine and hydrogen chloride. The quartz powder's alkali and alkaline earth contaminations will react with the chloric gas mixture, forming gaseous metal chlorides. The treatment gas and the gaseous reaction products are subsequently exhausted.

In this manner, especially such contaminations can be removed which can pass over into the gas phase through hot chlorination. The known method thus achieves a significant reduction of alkali and alkaline earth contaminations in the quartz powder. However, the method is unsuitable for contaminations which cannot be removed by chlorination. Moreover, the degree of purification depends on the quartz powder's reaction period with the chloric gas mixture and on the reaction temperature. At higher temperatures, chlorine reacts faster with the metallic contaminations so that a better cleaning effect could be expected with increasing temperatures. However, the softened grain tends to form agglomerates which impedes free access of the treatment gas to the individual grains' surface and thus reduces the cleaning effect of the treatment gas.

SUMMARY OF THE INVENTION

This invention is accordingly based on the task of specifying a method for the cleaning of $SiO_2$ grain which achieves high grain purity at comparatively little expenditure of time, material and costs, and of providing a simple device suitable for the implementation of the method.

In view of the method, this task is solved on the basis of the initially described cleaning method according to the invention such that $SiO_2$ grain is fed to and heated in a gas stream which is directed towards an impingement plate, the $SiO_2$ grain being accelerated in the direction of the impingement plate such that softened contaminations or melting agglomerates adhere to the impingement plate and cleaned $SiO_2$ grain is removed from the impingement plate.

The $SiO_2$ grain can consist of natural crystalline quartz or of quartz glass grain which in turn may be made of natural quartz or of synthetic starting materials. The contaminations of the $SiO_2$ grain may be either mineral substances such as usually found in natural quartz or substances which were imported into the grain during preparation of the raw materials or in the course of further processing, for example due to abrasion.

$SiO_2$ grain of crystalline quartz melts at approx. 1700° C. whereas no defined melting point can be assigned to amorphous $SiO_2$ grain, but much rather a gradual viscosity decrease is observed with increasing temperature. The melting points of purely mineral contaminations or of metallic abrasions—such as steel for example—are usually at temperatures of under 1500° C. Due to mixing or alloying of the contaminations with substances from the $SiO_2$ grain, the melting or softening temperatures may be even somewhat lower.

The $SiO_2$ grain comprising contaminations is fed to the gas stream and heated therein to a temperature at which the contaminations will soften which is understood to also include melting, or where the contaminations with $SiO_2$ grain form softened melting agglomerates. Hereinafter, the molten or softened contaminations and the melting agglomerates comprising contaminations will be called "softened contamination particles". By means of the gas stream, the grain including the softened contamination particles are thrown onto the impingement plate. Since, in the method according to the invention, the grain is heated and fed in the gas stream without contact to the furnace walls, no sticking of the grain to the furnace walls need be expected; and other marginal conditions for the cleaning processes are inapplicable, such as the abrasion resistance or temperature stability of a furnace material. The grain can thus be heated to very high temperatures at which even those contaminations soften, melt up or form melting agglomerates which cannot be removed by the generic method due to their high melting or softening temperatures.

The separation of contaminations from the remaining grain is due to the softened contamination particles or at least part thereof adhering to the impingement plate; however, no pure $SiO_2$ grain will do so, or very little thereof. Decisive for the degree of separation shall be difference between the adhesive capacities of softened contamination particles on the one hand and pure $SiO_2$ grain on the other hand at the impingement plate. The respective adhesive capacities in turn essentially depend on the viscosity immediately before the impingement plate. Best adhesive capacity can generally be expected in a viscosity range of doughy consistency. Ideally, all softened contamination particles will adhere to the impingement plate, but no pure $SiO_2$ grain. Thus, the $SiO_2$ grain is not or only slightly softened in the area of the impingement plate.

After impacting on the impingement plate, the non-adhesive $SiO_2$ grain will be removed from there. The simplest manner is by the force of gravity whereby the $SiO_2$ grain drops to the bottom at a right angle to the impingement plate. However, the impingement plate may also be inclined with regard to the direction of movement of the $SiO_2$ grain so that it does not stop the $SiO_2$ grains' movement but merely deflects their direction of movement. Especially in the last case, the temporary and loose adhesion of softened contamination particles on the impingement plate may already suffice, if, after adhesion, the further movement of softened contamination particles differs with regard to the velocity and/or direction versus the movement of the $SiO_2$ grain.

Compared with the generic method, the no-contact heating according to the invention will allow the adjustment of higher softening temperatures. Thus, even contaminations with high melting and softening temperatures are obtained—largely irrespective of the size of the softened contamination particles and melting agglomerates or their mechanical stability. Here, the method according to the invention also enables the removal of contaminations that either cannot be chlorinated at all or barely so.

An impingement plate of quartz glass is advantageously used. Quartz glass excels with its high mechanical resistance and its stability to changing temperatures. Contaminations given off from a quartz glass impingement plate to the $SiO_2$ grain are negligible.

Particularly suitable proved to be an impingement plate whose surface has a mean roughness depth $R_a$ of 0.5 μm or more. Roughness improves the degree of separation by increasing the adhesive capacity for the softened contamination particles while it hardly influences the adhesion of the $SiO_2$ grain which is not or only slightly softened. The value for roughness depth $R_a$ is ascertained according to DIN 4768.

A method is preferred in which the impingement plate is heated. Heating can further improve the degree of separation. During the cleaning process, the impingement plate is kept at a temperature at which the softened contamination particles adhere as optimally as possible to the impingement plate while the $SiO_2$ grain rebounds from it. Heating can also prevent the breaking away of solidifying contamination particles from the impingement plate due to different thermal expansions on both sides.

The impingement plate is advantageously moved perpendicularly to the direction of the gas stream. Thus, fresh impingement plate can be provided as soon as its effect subsides due to the adherent melting agglomerates. The impingement plate can be moved continuously or step-wise. The direction of movement is perpendicular to the direction of the spreading gas stream so that its distance to the impingement plate is equidistant before and after the movement.

It proved advantageous to adjust the temperature of the $SiO_2$ grain to a value in the range of between 1,000° C. and 2,200° C. in the area of the impingement plate. These temperature data relating to the surface of the grain shall be used only as approximate reference values. Because the grain's degree of softening not only depends on the temperature but also, for example, on the size of the $SiO_2$ grains and the duration of heating. At high temperatures, even contamination particles with high melting points will soften which are not caught due to the rotary furnace's limited temperature stability with the generic cleaning method. It is true that—at temperatures of above approx. 1800° C.—superficial melting or softening of $SiO_2$ grain may occur which, however, merely causes a mostly desirable spheroidizing of the $SiO_2$ grain.

The grain's conglutination is prevented by means of fine dispersion in the gas stream and by the surface's cooling and sufficient solidification prior to contact with the impingement plate. In the method according to the invention, it is possible to set such high treatment temperatures due to the fact that the grain is heated in the gas stream without having to heat parts of the cleaning device simultaneously high in like manner.

The cleaning effect of the cleaning method according to the invention is even intensified by the $SiO_2$ grain being introduced in fine distribution in the gas stream. Its introduction into the gas stream can be done by spreading or spraying for, example. One benefit with this procedure is that the $SiO_2$ grain is finely distributed—"dispersed"—in the gas stream and thus agglomerations of $SiO_2$ grain can be prevented. Such agglomerations are observed with the initially described hot chlorination when the $SiO_2$ grains softened in the rotary furnace begin to adhere to each other. The cleaning effect of the treatment gas is reduced thereby. In contrast, the grains can be separately heated to high temperatures by dispersing them—particularly by spreading or spraying the $SiO_2$ grains in the gas stream—so that they will soften without adhering to one another. Thus, dispersing in the gas stream allows all grains to be exposed uniformly and, moreover, to particularly high temperatures. The cleaning effect will not only be improved thereby, but it is more reproducible because agglomerates are avoided.

The gas stream preferably contains a halogenous treatment gas. The halogenous treatment gas supports the method's cleaning effect because such contaminations—forming volatile reaction products with halogens—can be removed even more effectively. Suitable as a halogenous treatment gas are the elements fluorine, chlorine, bromine, iodine, gaseous chemical compounds of these elements and mixtures of the elements and compounds.

One method proved particularly advantageous where the gas stream comprises a burner gas with a hydrogenous component which is burnt by forming a burner gas flame into which the $SiO_2$ grain is continuously fed. Here, the $SiO_2$ grain is exposed to a burner gas flame, heated therein and simultaneously precleaned. The grain is heated by the heat of reaction during combustion of the hydrogenous component of the burner gas. Combustion is understood to mean any form of exothermic fast oxidation of the hydrogenous component which enables the grain's heating. Suitable as the hydrogenous component are for example hydrogen or hydrocarbon compounds such as propane or acetylene. As the reaction partner for the combustion of the hydrogenous component may be used for example oxygen, oxygen compounds, halogens and halogen compounds. A halogenous component of the burner gas will achieve an additional cleaning effect. By means of the burner gas flame, higher temperatures may be set, and fast temperature changes are allowed. Accordingly, the $SiO_2$ grain can be exposed to very fast temperature changes in the burner gas flame and thus be heated abruptly. $SiO_2$ grains may burst thereby, primarily grains with interior stresses due to prior damage and structural defects. Cause for such defects are frequently foreign atoms. Due to the bursting grains, foreign atoms come to the free surface from where they can be easily removed by softening and separation by means of adhesion to the impingement plate as well as—favored by the high temperatures—by reaction with halogenous components of the gas stream.

The method according to the invention enables continuous cleaning because the $SiO_2$ grains are continuously fed to the gas stream.

It proved advantageous to feed heated $SiO_2$ grains to the gas stream. This will reduce the time span required for softening the contaminations.

For a solution of the above specified task with regard to the device for the implementation of the method, the device is provided with a burner according to the invention into which a burner gas is introduced by means of which a burner gas flame is produced, and with a feeder device by means of which the $SiO_2$ grain containing contaminations is fed to the burner gas flame, and with an impingement plate toward which the burner gas flame is directed.

The burner gas flame produced by means:.of the burner serves to heat the $SiO_2$ grain. To this end, the $SiO_2$ grain containing the contaminations is fed to the burner gas flame by means of the feeder device and, therein, it is heated to a temperature at which the contaminations are forming softened contamination particles. The $SiO_2$ grain can be fed to the burner gas flame through the burner. If necessary, the burner is connected with the feeder device, and has a corresponding burner nozzle for the $SiO_2$ grain. Yet, feeding the grains. may also comprise a spreading with the feeder device then formed as a chute device. The $SiO_2$ grains may also be fed in by spraying or injection; in these cases, the feeder device comprises a pressure device for producing high pressure or low pressure, and it further comprises a nozzle. It is essential that, by means of the feeder device, the $SiO_2$ grain can be fed to the burner gas flame and be dispersed therein.

Moreover, the device according to the invention is characterized by an impingement plate which is directed to the burner gas flame. In the simplest case, the impingement plate is planar in form. However, it may also have other forms; for example, the impingement plate may be arched or provided with surface structures. By means of the burner gas flame, the grain is heated without contact to any furnace walls and subsequently thrown onto the impingement plate together with the softened contamination particles. Thus, adhesion of grains to the furnace walls need not be expected; and marginal conditions are inapplicable, such as the abrasion resistance or the temperature stability of a furnace material. Thus, the device according to the invention may be designed especially simple. The grain is heated to very high temperatures without any contact, with even those contaminations softening, melting or forming melting agglomerates which cannot be removed due to their high melting or softening temperatures by means of the generic device.

Reference is made to the above explanations on the method according to the invention, with regard to the separation of,contaminations from the remaining grains by adhesion to the impingement plate, its effect and its arrangement relative to the direction of movement of the $SiO_2$ grain.

The impingement plate is advantageously made of quartz glass. Quartz glass is characterized by high mechanical strength and its stability with regard to temperature changes. Contaminations given off from the quartz glass impingement plate due to abrasion are negligible.

An impingement plate proved especially suitable whose surface has a mean roughness depth $R_a$ of 0.5 µm or more. Roughness improves the degree of separation by increasing the adhesive capacity for the softened contamination particles while it hardly influences the adhesion of the $SiO_2$ grain which is not softened at all or only slightly softened.

An impingement plate proved favorable whose normal surface is inclined relative to the direction of the burner gas flame or is running at an oblique angle. Such alignment of the impingement plate relative to the spreading direction of the burner gas flame and thus also relative to the direction of movement of the $SiO_2$ grain may influence the separation of contaminations from $SiO_2$ grains. In the simplest case, the $SiO_2$ grain impacts the impingement plate at a right angle and will be thereafter removed from the impingement plate as the $SiO_2$ grain drops to the bottom, for example in a collection vessel arranged underneath the impingement plate. Here, contaminations dropping from the impingement plate may also fall into the collection vessel. This can be prevented by an inclined impingement plate where the $SiO_2$ grain's movement is not stopped but its direction of movement is deflected so that the grains are collected at a point where no contaminations dropping from the impingement plate may arrive. Moreover, the inclination of the impingement plate relative to the $SiO_2$ grain's direction of movement may influence the adhesive properties of the $SiO_2$ grain and the softened contamination particles.

Preferable is a variation of the device according to the invention where the impingement plate is connected with a temperature facility. By means of the temperature facility, the impingement plate can be heated to a nominal temperature, or cooled down to it, or maintained at the nominal temperature.

Regarding the implementation of an inclination of the impingement plate relative to the $SiO_2$ grain's direction of movement and the advantages resulting therefrom, reference is made to the above explanations for the method according to the invention. An impingement plate proved advantageous which is defined by an orthogonal which is inclined relative to the direction of the gas stream or is running at an oblique angle. In a simple embodiment of the device according to the invention, the impingement plate is tiltably designed so that the tilting angle can easily be adjusted and optimized with regard to the separation and the adhesive properties.

Particularly simple in design is an embodiment of the device according to the invention where a chlorine/oxyhydrogen burner is used as a burner. High temperatures of more than 1300° C. can easily be achieved by means of the chlorine/oxyhydrogen flame. Moreover, the chlorine will contribute to the cleaning effect as already explained above in more detail on the basis of the method according to the invention.

In view of the avoidance of contaminations due to abrasion or chemical stripping, burner and/or feeder device will advantageously consist of quartz glass.

It proved favorable to provide the feeder device with a heating apparatus acting upon the $SiO_2$ grain. By means of the heating apparatus, the $SiO_2$ grain can be preheated which can reduce the required dwell time of the grain in the burner gas flame. This is especially of advantage if the distance between burner gas flame and impingement plate is short.

BRIEF DESCRIPTION OF THE FIGURES

Hereinafter, the invention is described in greater detail on the basis of embodiments and on the basis of a patent drawing. The drawing shows in detail and in diagrammatic presentation.

DETAILED DESCRIPTION

Figure 1:
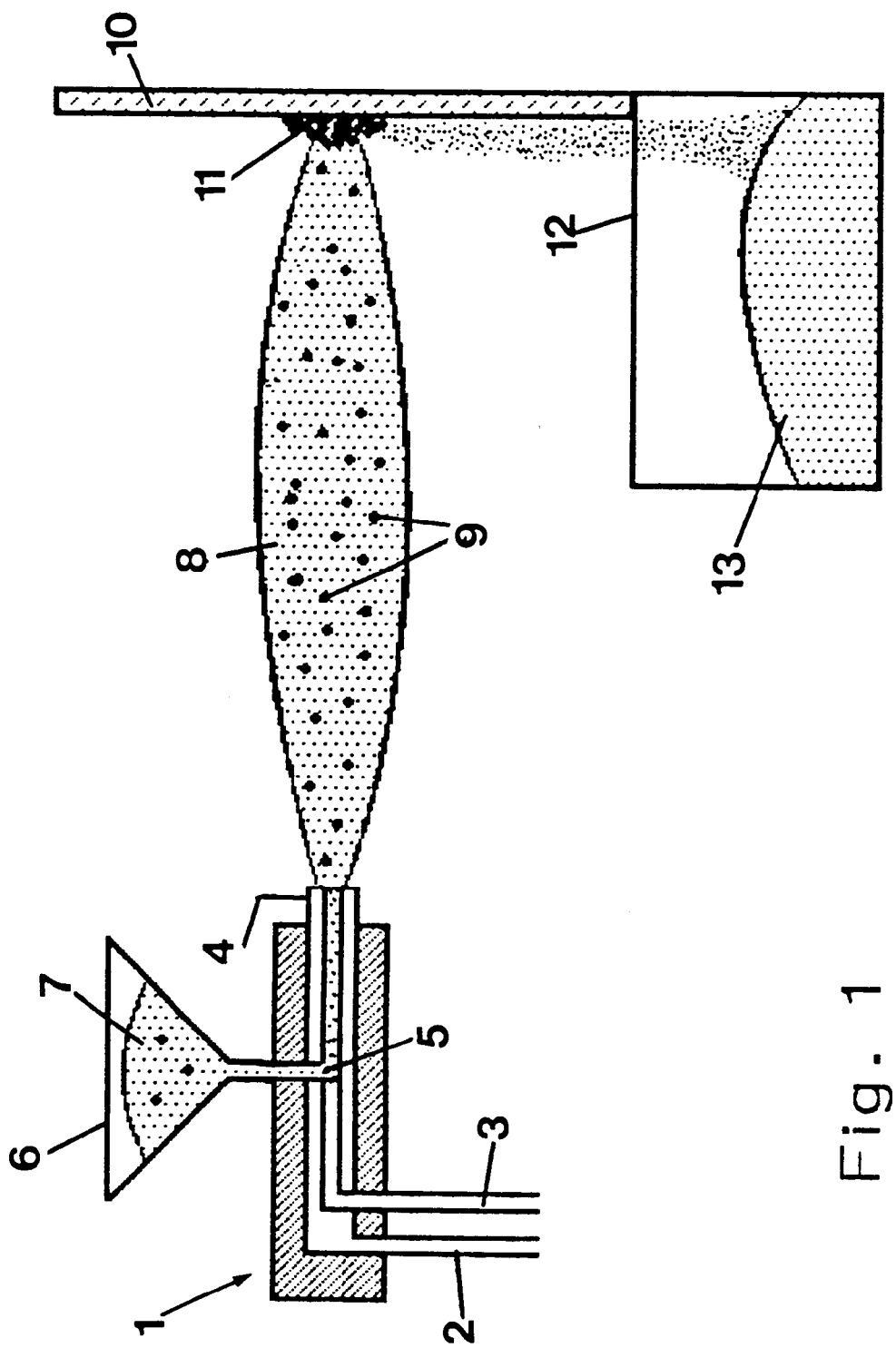
FIG. 1: a first embodiment of the device according to the invention in a lateral view.

The embodiment of the device according to the invention as shown in FIG. 1 is provided with a gas burner 1 made of quartz glass which has an outer gas nozzle 2 for hydrogen which coaxially surrounds an inner gas nozzle 3 for oxygen as a ring slot. The outer gas nozzle 2 and the inner gas nozzle 1 open out in the area of the burner head 4 outside of the burner where the combustion gases hydrogen and oxygen react exothermally with the formation of an oxyhydrogen flame 8.

Within the gas burner 1, a quartz glass filling funnel 6 ends in the inner gas nozzle 3; quartz grain 7 to be continuously cleaned is charged via the funnel to the gas burner 1. The flow of the burner gases produces a low pressure like that of a Venturi nozzle—in the area of the mouth 5 of the filling funnel—due to which the quartz grain 7 is entrained, fed to the oxyhydrogen flare 8 and heated therein. The oxyhydrogen flame 8 is directed toward a quartz glass plate 10 on which the softened contamination particles 9 adhere as a gradually solidifying melting layer 11 while the pure $SiO_2$ particles collect as purified quartz grain 13 in a collection vessel 12 arranged underneath the quartz glass plate 10. The quartz glass plate 10 is 1 cm thick, and the surface facing the oxyhydrogen gas flame 8 has a mean roughness depth $R_a$ of about 2 μm. The surface roughness improves the adhesion of the softened contamination particles 9.

Hereinafter, an embodiment of the method according to the invention is described in more detail on the basis of the device diagrammatically shown in FIG. 1:

Burner 1 is fed with 2 mol/min hydrogen and 1.1 mol/min oxygen. Oxygen and hydrogen react exothermally with each other in an oxyhydrogen reaction, under formation of the oxyhydrogen flame 8. In the embodiment, a maximum temperature of around 2300° C. is reached in the oxyhydrogen flame 8.

The quartz grain 7 to be cleaned is a grain of a naturally occurring crystalline quartz. The mean grain size ($D_{50}$ value) of quartz grain 7 is approx. 180 μm; aside from alkali and alkaline earth contaminations in the form of silicates and oxides, it also contains manganese and aluminum compounds, such as for example garnets and mica, as well as compounds of so-called nonferrous heavy metals such as Fe, Cu, Ni and Cr. The contaminations are generally present in form of minerals whose melting or softening temperatures are in a range of below 1500° C. The 3rd line of the following table 1 shows the starting concentrations of contamination elements in weight ppb; and the 4th line, the concentrations of the same contaminations after once running through the cleaning method according to the invention.

Temperatures and dwell times of the quartz grain 7 in the oxyhydrogen flame 8 are adjusted such that the particles containing contaminations will soften; not however, the pure $SiO_2$ particles. As Table 1 shows the concentrations of contaminations in quartz grain 7 are usually in the range of weight ppm or weight ppb. For illustration purposes, the contamination particles 9 in FIG. 1 are shown exaggerated in size and number. The throughput through burner 1 for the quartz grain 7 to be purified is set to approx. 60 g/min. Quartz grain 7 is finely distributed in the oxyhydrogen flame 8 and is abruptly heated therein. Larger grains and grains having internal defects will burst so that occluded contaminations will be exposed which facilitates their softening in the oxyhydrogen flame 8.

The distance between burner 1 and quartz glass plate 10 is set to 0.5 m. This results in a dwell period of the quartz grain 7 in the oxyhydrogen flame 8 of significantly less than one second. However, due to the high temperatures, the short dwell period is sufficient for softening most contaminations and their chemical compounds.

Separation of the purified quartz grain 12 from contaminations is such that the softened contamination particles 9 primarily adhere to the quartz glass plate 10; however, not the pure $SiO_2$ particles. Screening or sifting is not necessary—as in the generic method. Thus, the cleaning method according to the invention is essentially effective independent of the size of the contamination particles 9; even very small and very large contamination particles 9 are collected. The former cannot be easily removed in the generic method since they do not remain in the screen residue during screening of the melting agglomerates; the latter pose problems during hot chlorination since diffusion and reaction processes with large particles require very long treatment times. Moreover, and due to the high temperatures in the oxyhydrogen flame 8, the method according to the invention picks up even contaminations with high softening or melting temperatures, and it is also effective for contaminations such as, for example, the garnet andradite ($Ca_3Fe_2$ $[SiO_2]_3$) which cannot be readily removed by means of hot chlorination. The last line of Table 1 shows a degree of purity of quartz grain 7 obtained—after a first throughput— by means of the method according to the invention.

Figure 2:
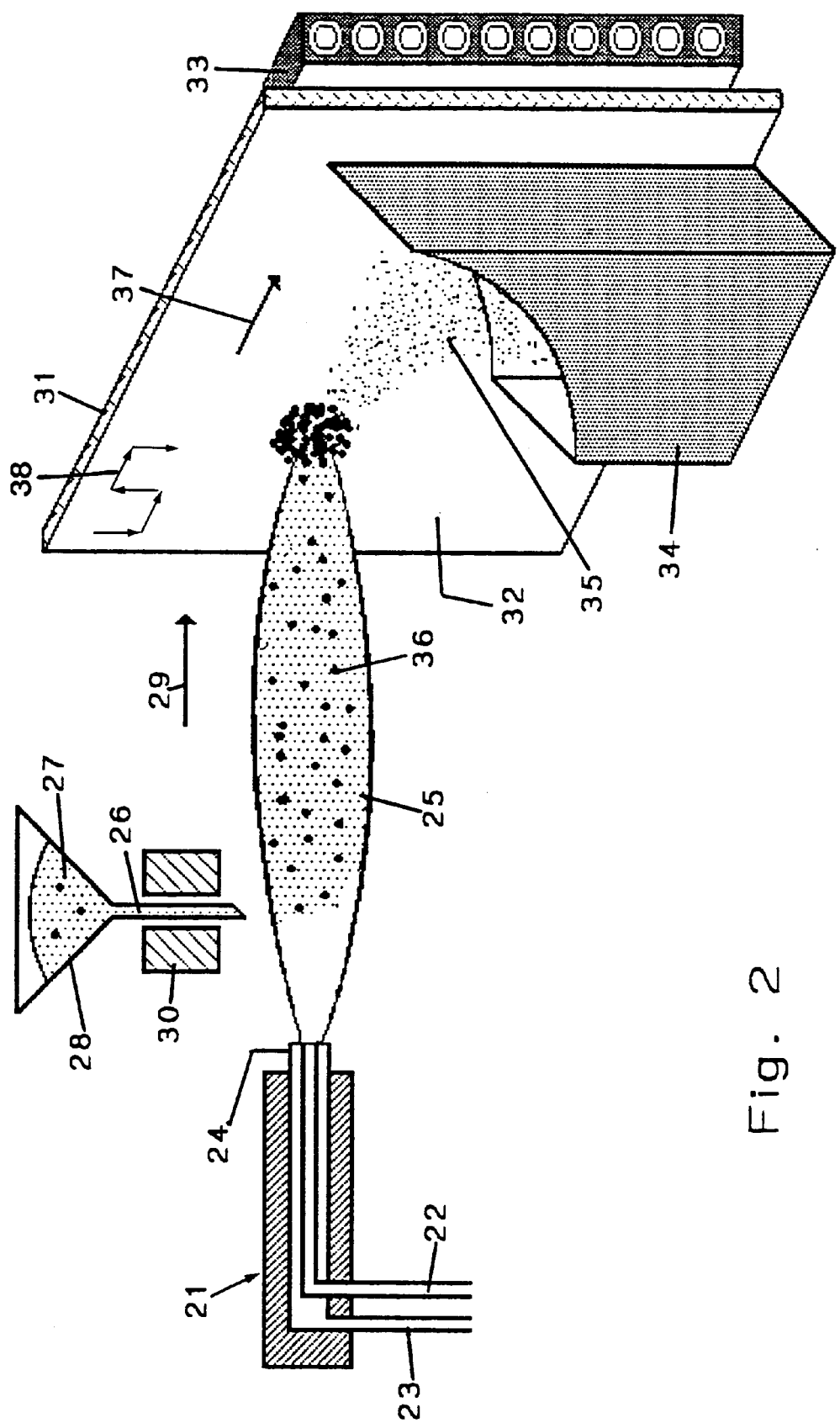
FIG. 2: another embodiment of the device according to the invention in a partially three-dimensional view.

In the embodiment of the device according to FIG. 2, reference number 21 is assigned overall to a chlorine/oxyhydrogen gas burner. The chlorine/oxyhydrogen gas burner 21 is provided with one gas inlet 22 for chlorine and another gas inlet 23 for hydrogen. Chlorine and hydrogen emanate from the burner head 24 from separate burner nozzles and react with each other in an exothermal chlorine/oxyhydrogen gas reaction by forming HCl in a chlorine/oxyhydrogen gas flame 25. Directional arrow 29 shows the direction of flow of the gas stream emanating from burner head 24. Above the chlorine/oxyhydrogen gas flame 25 ends a charge trunk 26 which is connected with the storage vessel 28 for quartz grain 27. By means of the charge trunk 26,

TABLE 1

Contaminations of the quartz grain

Contaminations in weight ppb

| Grain | Na | K | Li | Mg | Ca | Al | Fe | Cu | Ni | Cr | Mn |
|---|---|---|---|---|---|---|---|---|---|---|---|
| before | 1100 | 1050 | 710 | 32 | 370 | 16,000 | 410 | 9.5 | 7.5 | 14.0 | 110 |
| after | <50 | <50 | <350 | 32 | 100 | <16,000 | <50 | <1 | <1 | <1 | <30 | quartz grain 27 is spread into the chlorine/oxyhydrogen gas flame 25 essentially perpendicular to the direction of flow 29.

Charge trunk 26 is surrounded by an annular propane gas burner 30 by means of which the quartz grain 27 is heated to a temperature of approx. 1000° C. prior to their spreading into the chlorine/oxyhydrogen gas flame 25.

The chlorine/oxyhydrogen gas flame 25 is directed towards a planar quartz glass plate 31 which is arranged obliquely opposite the flow direction 29 of the burner gases so that its surface comprises an 80° angle with the direction of spread of the chlorine/oxyhydrogen gas flame 25. The front 32 of quartz glass plate 31 facing the chlorine/oxyhydrogen gas flame 25 has a mean roughness depth $R_a$ of 3 μm. The quartz glass plate 31 is kept at a temperature of approx. 800° C. by means of an infrared planar radiator 33. A drip pan 34 for purified quartz grain 35 is provided in the area of the front 32 of quartz glass plate 31. Burner 21, charge trunk 26, collection vessel 28 and drip pan 34 each consist of quartz glass.

The distance between burner 21 and quartz glass plate 31 is set to 0.75 m. Thus results a dwell time of the quartz grain 27 in the chlorine/oxyhydrogen gas flame 25 of significantly less than one second. However, due to the high temperatures, the short dwell time will be sufficient for most of the contaminations and their chemical compounds.

Quartz glass plate 31 is continuously moved meanderingly in the manner indicated by the directional arrows 38 and perpendicular to the flow direction 29 with a velocity of motion of 3 cm/h.

In accordance with the procedure explained further above, the following describes in detail another embodiment for the method according to the invention, based on the cleaning device shown diagrammatically in FIG. 2:

Burner 1 is charged with 4 mol/min hydrogen and 4.2 mol/min chlorine. Chlorine and hydrogen react exothermally with each other in a chlorine/oxyhydrogen gas reaction, according to the equation of the chemical reaction

$$H_2 + Cl_2 \rightarrow 2\ HCl \quad (1)$$

by forming the chlorine/oxyhydrogen gas flame 25. The reaction enthalpy of the chlorine/oxyhydrogen gas reaction is 241.98 kJ. In the embodiment, this results in a temperature of the chlorine/oxyhydrogen gas flame 25 of approx. 1800° C. Due to the fact that chlorine—relative to the reaction equation (1)—is charged to the burner 21 in stoichiometric profusion, complete combustion of hydrogen is ensured, and the chlorine/oxyhydrogen gas flame 25 contains free chlorine as well, aside from HCl. Moreover, particularly reactive chlorine radicals will form in the chlorine/oxyhydrogen gas flame 25. This gas mixture in the chlorine/oxyhydrogen gas flame 25 is called cleaning gas hereinafter.

By means of charge trunk 26, the preheated quartz grain 27 is spread continuously and finely distributed into the chlorine/oxyhydrogen gas flame 25 and accelerated due to the flow of the burner gases in direction of the quartz glass plate 31. Preheating of the quartz grain 27 by means of the propane burner 30 allows a comparatively higher feed rate to the chlorine/oxyhydrogen gas flame 25. In the embodiment, the feed rate is 60 g/min. In the chlorine/oxyhydrogen gas flame 25, the quartz grain 27 is abruptly heated so that larger grains and those grains having a defect will burst. Contaminations enclosed in the grain are thus exposed so that the cleaning gas may act upon the fine-grained and finely distributed quartz grain 27, with solid oxide contaminations being converted to the corresponding volatile chlorides. This effect of the cleaning gas is promoted by the high temperature of the chlorine/oxyhydrogen gas flame 25. Moreover, the contaminations soften by forming softened contamination particles 36 which will deposit on the quartz glass plate 31 due to the flow of the burner gases and in the form of a gradually solidifying melting layer 38. As indicated by the directional arrows 38, continuously fresh surface is provided due to the meandering motion of the quartz glass plate 31.

Reference is made to the above explanations on FIG. 1 regarding the separation of the contamination particles 36—adhering to the quartz plate 31—from the remaining quartz grain 27. A special characteristic of the method with regard to the separation results from the inclined arrangement of quartz glass plate 31 relative to the direction of movement 29 of the $SiO_2$ grain 27. This arrangement has the effect that non-adherent $SiO_2$ grains, due to their inertia, are passed a certain distance along the front 32 of quartz glass plate 31 as diagrammatically shown by the directional arrow 37. Thus, the cleaned $SiO_2$ grain 27 does not collect directly underneath the melting layer 38 but in an area away from melting layer 38 where it is received by drip pan 34. Due to this measure, the adhesive capacity of the $SiO_2$ grain 27 to the quartz glass plate 31 is reduced on the one hand; on the other hand, it is excluded that contamination particles 36 which might possibly loosen from the quartz glass plate 31 will get into the drip pan 34.

Another special characteristic versus the initially described method results from heating the quartz glass plate 31 by means of the planar radiator 33. On the one hand, this measure contributes to an improved adhesion of the contamination particles 36; on the other hand, it prevents a complete cooling down of the melting layer 38. Complete cooling of the melting layer 38 could result in the loosening of contamination particles 36 due to their greater or smaller heat expansion compared with quartz glass and thus result in the entrainment of contaminations into drip pan 34.

What is claimed is:

1. A method for cleaning $SiO_2$ grain containing contaminations, the method comprising:
   feeding the $SiO_2$ grain into a gas stream directed towards an impingement plate; heating the $SiO_2$ grain in the gas stream to a temperature at which the contaminations soften or form melting agglomerates;
   said $SiO_2$ grain being directed toward the impingement plate so that the softened contaminations or the melting agglomerates adhere to the impingement plate; and
   removing the $SiO_2$ grain from the impingement plate in a form wherein the contaminations are removed.

2. The method of claim 1, wherein the impingement plate is of quartz glass.

3. The method of claim 2, wherein the impingement plate has a surface with a mean roughness depth of at least 0.5 microns.

4. The method of claim 1, wherein the impingement plate has a surface with a mean roughness depth of at least 0.5 microns.

5. The method of claim 1, wherein the impingement plate is heated.

6. The method of claim 1, wherein the impingement plate is moved in a direction perpendicular to the gas stream.

7. The method of claim 1, wherein the temperature of the $SiO_2$ grain is adjusted to a value ranging between 1,000° C. and 2,200° C. adjacent the impingement plate.

8. The method of claim 1, wherein the $SiO_2$ grain is finely distributed when fed to the gas stream.

9. The method of claim 1, wherein the gas stream comprises a treatment gas containing a halogen.

10. The method of claim 1, wherein the gas stream comprises a burner gas with a component containing hydrogen, which component is burnt by forming a burner gas flame to which the $SiO_2$ grain is continuously fed.

11. The method of claim 1, wherein the $SiO_2$ grain is heated before being fed to the gas stream.

* * * * *